US008806123B1

(12) United States Patent
Kennedy et al.

(10) Patent No.: US 8,806,123 B1
(45) Date of Patent: Aug. 12, 2014

(54) EXPANDABLE DATA STORAGE SYSTEM

(75) Inventors: Brian Daniel Kennedy, Rutland, MA (US); Brian Arsenault, Leicester, MA (US); William F. Baxter, III, Holliston, MA (US); Antonio Fontes, Northbridge, MA (US)

(73) Assignee: EMC Corporation, Hopkinton, MA (US)

( * ) Notice: Subject to any disclaimer, the term of this patent is extended or adjusted under 35 U.S.C. 154(b) by 429 days.

(21) Appl. No.: 12/569,683

(22) Filed: Sep. 29, 2009

(51) Int. Cl.
*G06F 12/08* (2006.01)
*G06F 3/06* (2006.01)

(52) U.S. Cl.
CPC .............. *G06F 3/0689* (2013.01); *G06F 3/067* (2013.01)
USPC .......................................... 711/114; 711/112

(58) Field of Classification Search
CPC .............................. G06F 3/0689; G06F 3/067
USPC .................................. 711/112, 114
See application file for complete search history.

(56) References Cited

U.S. PATENT DOCUMENTS

| 2005/0154826 | A1* | 7/2005 | Marks et al. | 711/114 |
| 2008/0010530 | A1* | 1/2008 | Davies et al. | 714/31 |
| 2008/0126696 | A1* | 5/2008 | Holland et al. | 711/114 |
| 2009/0083484 | A1* | 3/2009 | Basham et al. | 711/114 |
| 2010/0312962 | A1* | 12/2010 | DeKoning et al. | 711/114 |

* cited by examiner

*Primary Examiner* — Than Nguyen
(74) *Attorney, Agent, or Firm* — Krishnendu Gupta; Konrad R. Lee

(57) ABSTRACT

A data storage system having a plurality of disk drive sections, each one of the disk drive sections having a plurality of disk drives. Each one of a plurality of secondary SAS expanders is coupled to a corresponding one of the disk drive sections. Each one of the secondary SAS expanders has: (1) a plurality of first ports each one being connected to a corresponding one of the disk drives in the corresponding one of the plurality of disk drive sections coupled thereto; and (2) a second port. A main SAS expander has: (1) a first port; and (2) N second ports, each one of the N second ports of the main expander being connected to the second port of a corresponding one of the plurality of N secondary expanders. A storage processor is coupled to the second port of the main SAS expander.

4 Claims, 2 Drawing Sheets

EXPANDABLE DATA STORAGE SYSTEM

TECHNICAL FIELD

This disclosure relates generally to data storage systems and more particularly to expandable data storage systems.

BACKGROUND

As is known in the art, large mainframe computer systems and data servers sometimes require large capacity data storage systems. One type of data storage system is a magnetic disk storage system. Here a bank of disk drives and the computer systems and data servers are coupled together through an interface. The interface includes storage processors that operate in such a way that they are transparent to the computer. That is, data is stored in, and retrieved from, the bank of disk drives in such a way that the mainframe computer system or data server merely thinks it is operating with one mainframe memory. One type of data storage system is a RAID data storage system. A RAID data storage system includes two or more disk drives in combination for fault tolerance and performance.

As is also known in the art, it is sometimes desirable that the data storage capacity of the data storage system be expandable. More particularly, a customer may initially require a particular data storage capacity. As the customer's business expands, it would be desirable to corresponding expand the data storage capacity of the purchased storage system.

As is also known in the art, Small Computer Systems Interface ("SCSI") is a set of American National Standards Institute ("ANSI") standard electronic interface specification that allow, for example, computers to communicate with peripheral hardware. SCSI interface transports and commands are used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards.

One arrangement or expanding a data storage system is shown in FIG. 1. Here, a storage processor (SP) used in such system is shown coupled to a Disk Array Enclosure (DAE) having two sections of disk drives, each section here having twenty-four disk drives. A link controller card (LCC) is included here having a pair of SAS expanders. Each one of the SAS expanders is coupled to a corresponding one of the two disk array sections and is also to a corresponding on of a pair of SAS ports, as indicated. Thus, each one of the expanders is coupled to the storage processor (SP) through separate SAS expanders. It is also noted that the DAE includes a power supply section, indicators & sensor section, and a cooling section. These sections are controlled by both expanders, as indicated.

With this arrangement, because two expanders are used in the DAE the DAE does not appear as a single enclosure to the SP because there are two logical points of entry into the system and thus with the twenty-four disk drives per expander, each set of twenty-four drives appears in separate SAS domains. Further, using separate expanders results in shared enclosure functions such as power, cooling and indicators are managed from both expanders; therefore, the SP requires special knowledge that both expanders are actually in the same enclosure. Further, at the present time there is no single expander available that has enough ports for 48 drives plus expansion cables.

In addition, with this arrangement, there are signal Integrity problems that may limit SAS cable lengths or limit disk drive choices. More particularly, enclosure used in such an arrangement would be very large in order to accommodate forty-eight disk drives and SAS paths would be relatively long. i.e., the expanders must be placed to favor cable length or disk drive signal path length.

SUMMARY

In accordance with the present disclosure, a data storage system is provided having a plurality of, N, disk drive sections, each one of the disk drive sections having a plurality of disk drives. A plurality of, N, secondary SAS expanders, is included, each one of the plurality of secondary SAS expanders is coupled to a corresponding one of the disk drive sections, each one of the secondary SAS expanders having: (1) a plurality of first ports each one being connected to a corresponding one of the disk drives in the corresponding one of the plurality of disk drive sections coupled thereto; and (2) a second port, such one of the plurality of secondary SAS expanders selectively routing data between the plurality of first ports and the second port. A main SAS expander is included having: (1) a first port; and (2) N second ports, each one of the N second ports of the main expander being connected to the second port of a corresponding one of the plurality of N secondary expanders, such main SAS expander selectively routing data between the first port thereof and the N second ports thereof.

In one embodiment an enclosure is proved having therein: the plurality of disk drive sections; the plurality of secondary SAS expanders; and the main SAS expanders.

In one embodiment, a storage processor coupled to the first port of the main SAS expander.

In one embodiment, a second enclosure is provided having therein a second plurality of disk drive sections; a second plurality of secondary SAS expanders; and a second expander and wherein first port of the first mentioned main expander is coupled to the first port of the second main expander.

In one embodiment, the enclosure has therein one or more of a power, cooling and indicator sections and the wherein the main expander is coupled to one or more of the power, cooling and indicator sections.

In one embodiment, the main expander is on one printed circuit board and the plurality of secondary expanders is on a separate pointed circuit board.

With such an arrangement, the use of a main expander coupled to a plurality of secondary expanders provides a single point of entry from the storage processor. Thus, all disk drives appear in the same SAS domain and all enclosure functions are managed from one expander. Further, by separating the main expander and the plurality of secondary expanders onto separate printed circuit boards allows optimal expander placement within the enclosure. SAS signal integrity is optimized and the maximum cable lengths and maximum drive compatibility is achieved.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
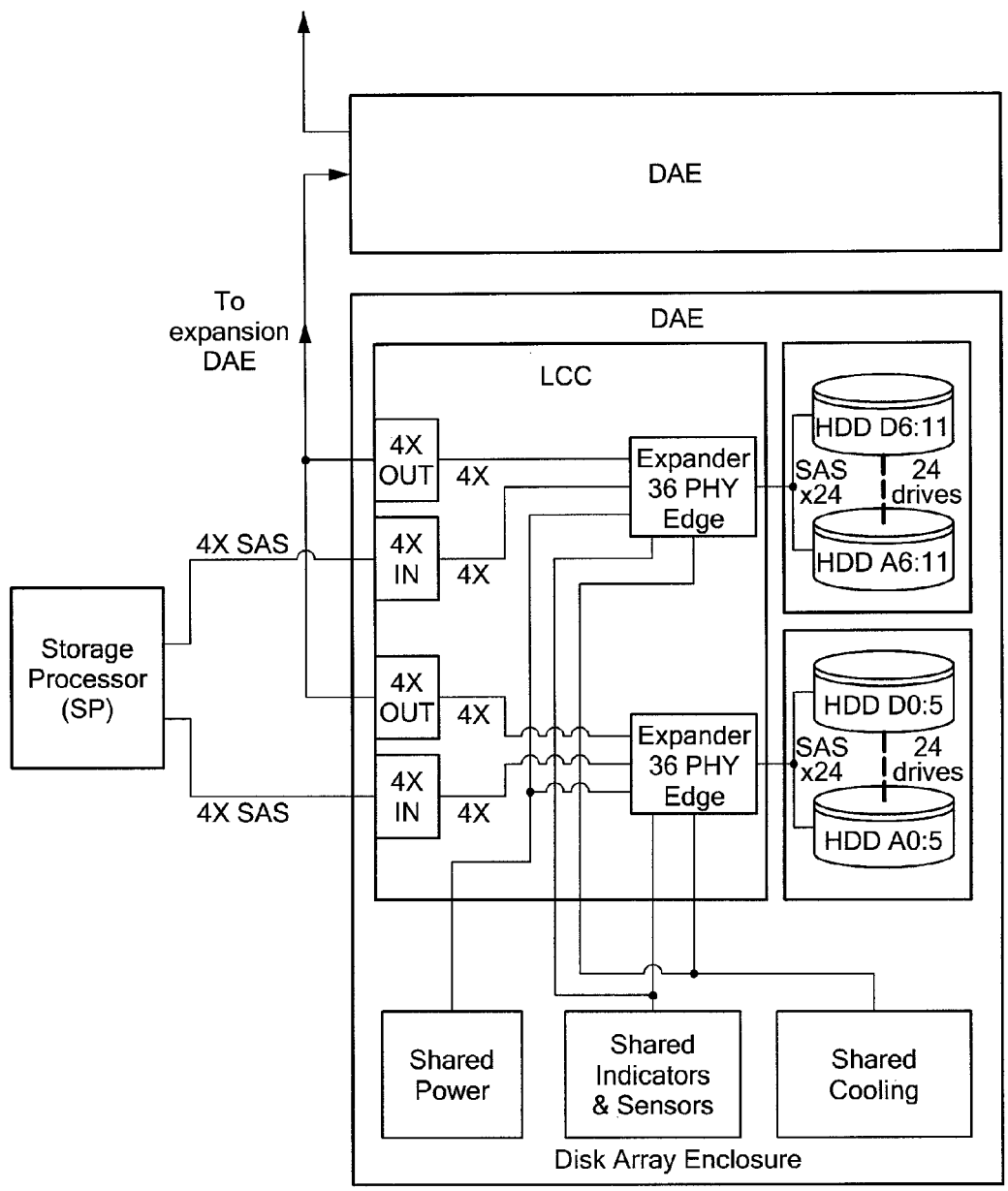
FIG. 1 is a block diagram of an expandable data storage system according to the PRIOR ART.
Figure 2:
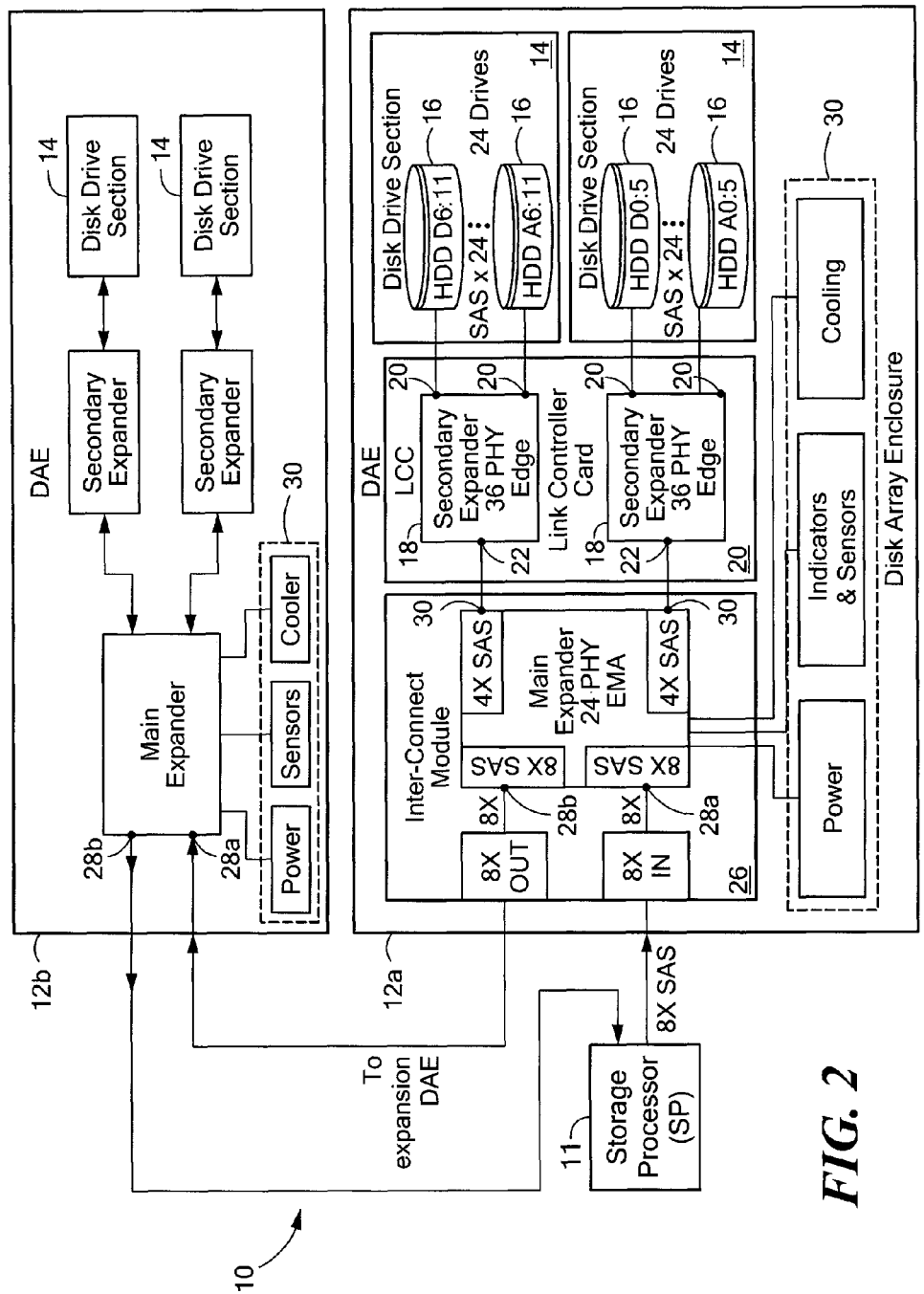
FIG. 2 is a block diagram of an expandable data storage system according to the disclosure.

Referring now to FIG. 2, a data storage system 10 is shown to include a storage processor (SP) 11 coupled to a plurality of, here 2, disk array enclosures (DAEs) 12a, 12b. Each one of the DAEs 12a, 12b is identical in construction, an exemplary one thereof here DAE 12a being shown to include: a plurality of N, here N=2, disk drive sections 14. Each one of the disk drive sections 14 has a plurality of; here 24 disk drives 16. The DAE 12a also includes a plurality of, N, secondary SAS expanders 18 as part of a LCC 20, as indicated. Each one of the secondary SAS expanders 18 is coupled to a corresponding one of the disk drive sections 14. Each one of the secondary SAS expanders 18 includes a plurality of first ports 20 and a second port 22. Each one of the first ports 20 is connected to a corresponding one of the disk drives 16 in the in the corresponding one of the disk drive sections 14 coupled thereto. Here, each one of the secondary expanders is a 36PHY expander having 24 SAS paths as the first ports 20 and 4 SAS paths as the second port 22. Each one of the secondary SAS expanders 18 selectively routs data between the plurality of first ports 20 and the second port 22.

The DAE 12a also includes a main SAS expander 24 as part of an Inter-Connect Module 26. The main SAS expander 24 has: a first port 28; and a plurality of N second ports 30. Each one of the N second ports 30 of the main expander 24 is connected to the second port 22 of a corresponding one of the plurality of N secondary expanders 18. The main SAS expander 24 is here a 24PHY expander having for each one of the second ports 30 thereof a 4SAS path port and as the first port 28 thereof: an IN 4SAS path port 28a; and an OUT 4 SAS path port 28b. The main SAS expander 24 selectively routs data between the first port 28 thereof and the N second ports 30 thereof.

It is noted that for DAE 12a, the IN 4SAS path port 28a of the first port 28 of the main SAS expander 24 is coupled to the storage processor 11 and the OUT 4 SAS path port 28b of the first port 28 of the DAE 10a is coupled to the IN 4SAS path port 28a of DAE 10b. It is also noted that the OUT 4 SAS path port 28b of the first port of the DAE 12b is coupled to the storage processor 11.

It is noted that each one of the DAEs 12a, 12b has therein one or more of a power, cooling and indicator sections 30 and that the main expander 24 in each DAE 12a, 12b is coupled to one or more of the power, cooling and indicator sections 30.

A number of embodiments of the disclosure have been described. Nevertheless, it will be understood that various modifications may be made without departing from the spirit and scope of the disclosure. For example, N may be more than 2. Accordingly, other embodiments are within the scope of the following claims.

What is claimed is:

1. A data storage system comprising:
   a plurality of disk drive sections, each one of the disk drive sections having a plurality of disk drives;
   a plurality of secondary SAS expanders coupled to a corresponding one of the disk drive sections, each one of the secondary SAS expanders having: (1) a plurality of first ports each one being connected to a corresponding one of the disk drives in the corresponding one of the plurality of disk drive sections coupled thereto; and (2) a second port; and
   a first and second main SAS expander having: (1) a first port; and (2) N second ports, each one of the N second ports of the first and second main expanders being connected to the second port of a corresponding one of the plurality of N secondary expanders;
   a first and second disk array enclosures having therein: the plurality of disk drive sections; the plurality of secondary SAS expanders; and one of the first and second main SAS expanders;
   wherein the enclosures having therein one or more cooling sections wherein the first and second main expanders is coupled to the one or more cooling sections; and
   a storage processor disposed outside of the first and second disk array enclosures and coupled to the first port of the first and second main SAS expanders, wherein the storage processor is enabled to communicate with each of the plurality of disk drive sections through a first logical point of entry through the first port of the first and second main SAS expanders.

2. The system recited in claim 1 including a second disk array enclosure having therein a second plurality of disk drive sections; a second plurality of secondary SAS expanders; and the second main SAS expander and wherein the first port of the first main SAS expander is coupled to the first port of the second main SAS expander; and
   wherein the storage processor is disposed outside of the second disk array enclosure.

3. The system recited in claim 2 including a storage processor coupled to the first port of the first and second main SAS expanders.

4. A data storage system, comprising:
   (A) a plurality of, N, disk drive sections, each one of the disk drive sections having a plurality of disk drives;
   (B) a plurality of, N, secondary SAS expanders, each one of the plurality of secondary SAS expanders coupled to a corresponding one of the disk drive sections, each one of the secondary SAS expanders having:
      (1) a plurality of first ports each one being connected to a corresponding one of the disk drives in the corresponding one of the plurality of disk drive sections coupled thereto; and
      (2) a second port, such one of the plurality of secondary SAS expanders selectively routing data between the plurality of first ports and the second port;
   (C) a first and second main SAS expanders having:
      (1) a first port; and
      (2) N second ports, each one of the N second ports of the first and second main SAS expanders being connected to the second port of a corresponding one of the plurality of N secondary SAS expanders, such that the first and second main SAS expanders selectively routing data between the first port thereof and the N second ports thereof;
   (D) a storage processor coupled to the first ports of the first and second main SAS expanders, wherein the storage processor is enabled to communicate with each of the plurality of, N, disk drive sections through a first logical point of entry through the first ports of the first and second main SAS expanders; and
   (E) a first and second disk array enclosures having therein: the plurality of disk drive sections; the plurality of secondary SAS expanders; and one of the first and second main SAS expanders;
      wherein the storage processor is disposed outside of the first and second disk array enclosures; and
      wherein the first and second disk array enclosures having therein one or more cooling sections, wherein the first and second main SAS expanders are coupled to the one or more cooling sections.

* * * * *